United States Patent
Koski

(10) Patent No.: US 6,192,126 B1
(45) Date of Patent: Feb. 20, 2001

(54) DOUBLE TALK DETECTOR, METHOD FOR DOUBLE TALK DETECTION AND DEVICE INCORPORATING SUCH A DETECTOR

(75) Inventor: Vesa-Pekka Koski, Tampere (FI)

(73) Assignee: Nokia Mobile Phones Ltd., Espoo (FI)

( * ) Notice: Under 35 U.S.C. 154(b), the term of this patent shall be extended for 0 days.

(21) Appl. No.: 09/086,305

(22) Filed: May 28, 1998

(51) Int. Cl.[7] .................................................. H04M 11/00
(52) U.S. Cl. ........................ 379/410; 379/406; 379/387
(58) Field of Search .................................... 379/410, 406, 379/407, 387, 389

(56) References Cited

U.S. PATENT DOCUMENTS

| Re. 28,919 | * | 7/1976 | Berkley et al. | 379/410 |
|---|---|---|---|---|
| 5,550,893 | | 8/1996 | Heidari | 379/59 |
| 5,598,468 | * | 1/1997 | Ammicht et al. | 379/410 |
| 5,715,310 | | 2/1998 | Hagqvist | 379/406 |
| 6,052,462 | * | 4/2000 | Lu | 379/410 |

FOREIGN PATENT DOCUMENTS

| 0053202 | 6/1982 | (EP) . |
|---|---|---|
| 0439139 A3 | 7/1991 | (EP) . |
| 0 454 242 A1 | 10/1991 | (EP) . |
| WO 95/23477 | 8/1995 | (WO) . |

OTHER PUBLICATIONS

European Search Report.

Patent Abstracts of Japan, JP 07303072, Nov. 1995.

* cited by examiner

Primary Examiner—Stella Woo
(74) Attorney, Agent, or Firm—Perman & Green, LLP

(57) ABSTRACT

A double talk detector for detecting double talk situations in a device capable of two-way voice communication. The double talk detector comprises means (2, 1) for receiving a speech signal (3, 5; 30, 50), and means (82, 83) for dividing the speech signal (30, 50) into subsignals representing specific frequency bands. A detection is performed (84, 85, 86) for each subsignal, and subdecision signals are calculated (87) on the basis of the detection. The subdecision signals indicate existence of double talk in the respective subsignals. A final decision signal is calculated (89, 90, 91) as a double talk decision signal DTD for the speech signal on the basis of the subdecision signals.

24 Claims, 3 Drawing Sheets

DOUBLE TALK DETECTOR, METHOD FOR DOUBLE TALK DETECTION AND DEVICE INCORPORATING SUCH A DETECTOR

FIELD OF THE INVENTION

The present invention relates to a method for double talk detection and a double talk detector, especially adapted to be used with or in an echo canceller, for detecting double talk situations in a device capable of two-way voice communication, the double talk detector comprising means for receiving a speech signal, means for dividing the speech signal into subsignals representing specific frequency bands, means for performing a detection for each subsignal, and means for calculating subdecision signals on the basis of the detection, the subdecision signal indicating existence of double talk in the respective subsignals. The invention also relates to a device incorporating such a double talk detector.

BACKGROUND OF THE INVENTION

Telephone communication is often disturbed by echo. This especially applies to full-duplex telephones which have four possible modes of operation: idle, near-speech, far-speech, and double-talk. Echo usually occurs in far-speech situations, when the received far-end signal reproduced by the speaker is caught by the microphone and thereby returns to far-end. A full-duplex telephone requires adaptive signal processing techniques to cancel acoustic feedback or echo. A known approach to avoid disturbing echo is to use an echo canceller or echo suppressor. Echo cancellers which are well known in the telephone communications environment usually employ a form of an adaptive digital filter. The echo canceller typically functions to disable the outgoing path from a phone when a signal from the far-end (speech received by the phone) appears on the incoming path. Therefore, echoes due to incoming signals on the receive path are prevented from returning to far-end over the outgoing path. Echo cancellation is usually implemented so that the parameters of the adaptive filter performing the echo cancellation are updated whenever far-end speech occurs in order to achieve echo cancellation as accurate as possible for each situation.

Double talking refers to the condition when the near end subscriber (the user of the phone) and the far-end subscriber talk simultaneously. When both parties talk simultaneously, i.e. during double talk, the echo canceller is no longer able to effectively block echo signals. This is because the echo signals are included in the near-end subscriber's signals to be transmitted, i.e. a desired signal to be transmitted and an echo signal are simultaneously applied to the send input. The super-positioning of these signals causes distortion of the adjustment of the echo canceller when it considers both the echo signal and the desired signal to be transmitted. This means that the replica produced by the echo canceller no longer sufficiently cancels the current echo signal. Accordingly, it is a current practice to provide a double talk detector for preventing the disturbing influence of double talk on echo canceller adjustment. This means that the parameters of the adaptive filter performing the echo cancellation are not updated during double talk. Echo and double talk are problems especially in speaker phones and in phones with hands-free equipment in which the far-end signal from the speaker is captured by the microphone.

Prior art echo suppressors include double talk detectors which distinguish between near-end speech, i.e. speech signals generated on the outgoing path by the near-end subscriber, and echo signals returning on the outgoing path due to far-end subscriber speech signals on the incoming path. If the outgoing path signal exceeds the incoming path signal it is assumed that the near-end subscriber is transmitting and the echo suppression is disabled. When the opposite condition occurs it is assumed that the near-end subscriber is not transmitting and the echo is suppressed.

FIG. 1 shows a block diagram of a phone comprising an echo canceller 1 known from prior art. The near-end signal 3 comes from the microphone 2 and is detected by a near-end voice activity detector 4 (VAD, Voice Activity Detector).

The far-end signal 5 comes from an input connection I of the phone (e.g. wire connection in wire phones and from air interface/antenna to reception branch in a mobile phone) and is detected by a far-end voice activity detector 6 and is finally output by the speaker 7. Both near-end signal 3 and far-end signal 5 are fed to a double talk detector 8 for double talk detection and to an adaptive filter 9 for performing echo cancelling. The adaptive filter 9 also receives the output of the double talk detector 8 in order to avoid adaptation of the filter during double talk. The adaptive filter 9 outputs a signal 10 which is subtracted from the near-end signal 3 in a summing/subtracting means 11 for cancelling echo and getting an echo cancelled output signal 12, which is forwarded to output connection 0 (e.g. wire connection in wire phones and from transmission branch to air interface/antenna in a mobile phone). The operation principle used is that the double-talk detector 8 needs the information of far-end speaker active and so it works only when there is far-end speech 5 and it is quite easy to detect if there is only far-end 5 or only near-end 3 speech. The adaptive filter 9 is controlled by double-talk, near-end and far-end detectors 8, 4 and 6. If there is double-talk, the coefficients of the adaptive filter 9 are frozen. The device of FIG. 1 could as well be a hands-free equipment with speaker, microphone, input and output connectors to a telephone device and the echo canceller situated in the hands-free device.

In European patent publication EP-B1-0 053 202 double talk detection is based on three detectors. A first detector compares the amplitude of the near-end signal before adaptation with the amplitude of the near-end signal after adaptation resulting in a first amplitude ratio. A second detector compares the amplitude of the near-end signal with the amplitude of the far-end signal resulting in a second amplitude ratio and a third detector compares the amplitude of the near-end signal before adaptation with the amplitude of the far-end signal resulting in a third amplitude ratio. The outputs of each detector are combined to make a common decision. The outputs are the above mentioned amplitude ratios taken over the entire frequency band. A drawback of this solution is that the result of adaptation affects the double talk detection so that actually a reliable detection is achieved only when the adaptation is false.

European patent publication EP-A2-0 439 139 discloses a double talk detector in which detection is based both on a cross-correlation value between the incoming signal and the echo signal and on a power ratio between the same signals. The power ratio is calculated over the entire frequency band. A drawback of this solution is that the changes of the cross-correlation value are slow, which makes double talk detection slow. The cross-correlation value is an average over several speech frames. The faster the double talk detection is the faster the adaptation (of the filter performing the echo suppression) can be stopped and false adaptation can be avoided. Likewise, when double talk detection is slow more false adaptation occurs.

European patent publication EP-A1-0 454 242 discloses an echo canceller in which double talk detection is performed by dividing the frequency band into narrower bands, i.e. into sub-channels. Then double talk detection is done separately for each sub-channel on the basis of the power ratio of a receive input signal and a send output signal. The detection result of each sub-channel is used only for adjustment of the adaptation of the same sub-channel in question. A drawback of this solution is that because the results are interpreted separately, a false echo cancellation result may be achieved if all sub-channels having double talk are not detected. Even if adaptation is stopped for a sub-channel in which double talk was detected a possibility exists that in a nearby sub-channel double talk exists as well, for which channel adaptation is, however, still performed because the double talk was not detected. That would lead to adaptation of the filter parameters for that sub-channel during double talk, which is not desired.

SUMMARY OF THE INVENTION

The present invention concerns a double talk detector, a double talk detection method and a device utilising such a double talk detector. The device may be a phone or any other voice communication device, an echo canceller or a hands-free accessory. In the present invention the far-end and near-end signals are divided into sub-channels by frequency. A power value is calculated for far-end and near-end signals for each sub-channel. Preferably the power value is calculated on basis of a short frame of samples of the signals. For each sub-channel a power ratio of far-end and near-end signals for the same sub-channel is calculated. According to the calculated power ratio a double talk decision is made for each sub-channel resulting in several decision signals. On the basis of the decision signals a final decision is made which is fed to the adaptation filter for adaptation of the whole frequency range. The final decision is made so that if predetermined part of the sub-channel decisions show double talk, then the final decision is double talk and accordingly adaptation over the entire frequency range is stopped. If less than the predetermined part of the sub-channel decisions show double talk, then the final decision is no double talk and accordingly adaptation of the filter parameters over the entire frequency range is performed in the same manner.

In practice the speech signal is during short frames of speech only divided over a narrow frequency range, i.e. speech exists only in a few sub-channels. Accordingly, the present invention has the advantages that since double talk is detected in sub-channels (and in short speech frames), detection can be made more accurately in a smaller frequency range. Thereby detection is made in those frequencies where speech really exists and accordingly possible disturbances on other frequencies are eliminated from affecting the double talk detections in the speech sub-channels. Also, since the final decision is still made over the entire frequency range a failed detection in one sub-channel does not deteriorate the final double talk decision. With the present invention it is better assured that the filter parameters are not adapted during double talk. When the detection is based on short speech frames each sub-channel double talk decision can be made very quickly. This makes the double talk detector quick so false adaptation of the adaptation filter can be avoided more quickly. The double talk detector according to the present invention is independent of the result of adaptation of the filter parameters, since the detections do not include any values taken after the adaptation. In the present invention no decision tables are needed and due to a rounding off before making the final double talk decision the double talk detector is not sensitive to occasional errors for example occurring in one of the sub-channels.

The double talk detector and the device according to the invention is characterized in that it comprises means for calculating a final decision signal as a double talk decision signal for the speech signal on the basis of the subdecision signals.

The method according to the invention is characterized by calculating a final decision signal as a double talk decision signal for the speech signal on the basis of the subdecision signals.

BRIEF DESCRIPTION OF THE DRAWINGS

The invention is described below in detail and references are made to the enclosed drawings in which.

DETAILED DESCRIPTION

Figure 2:
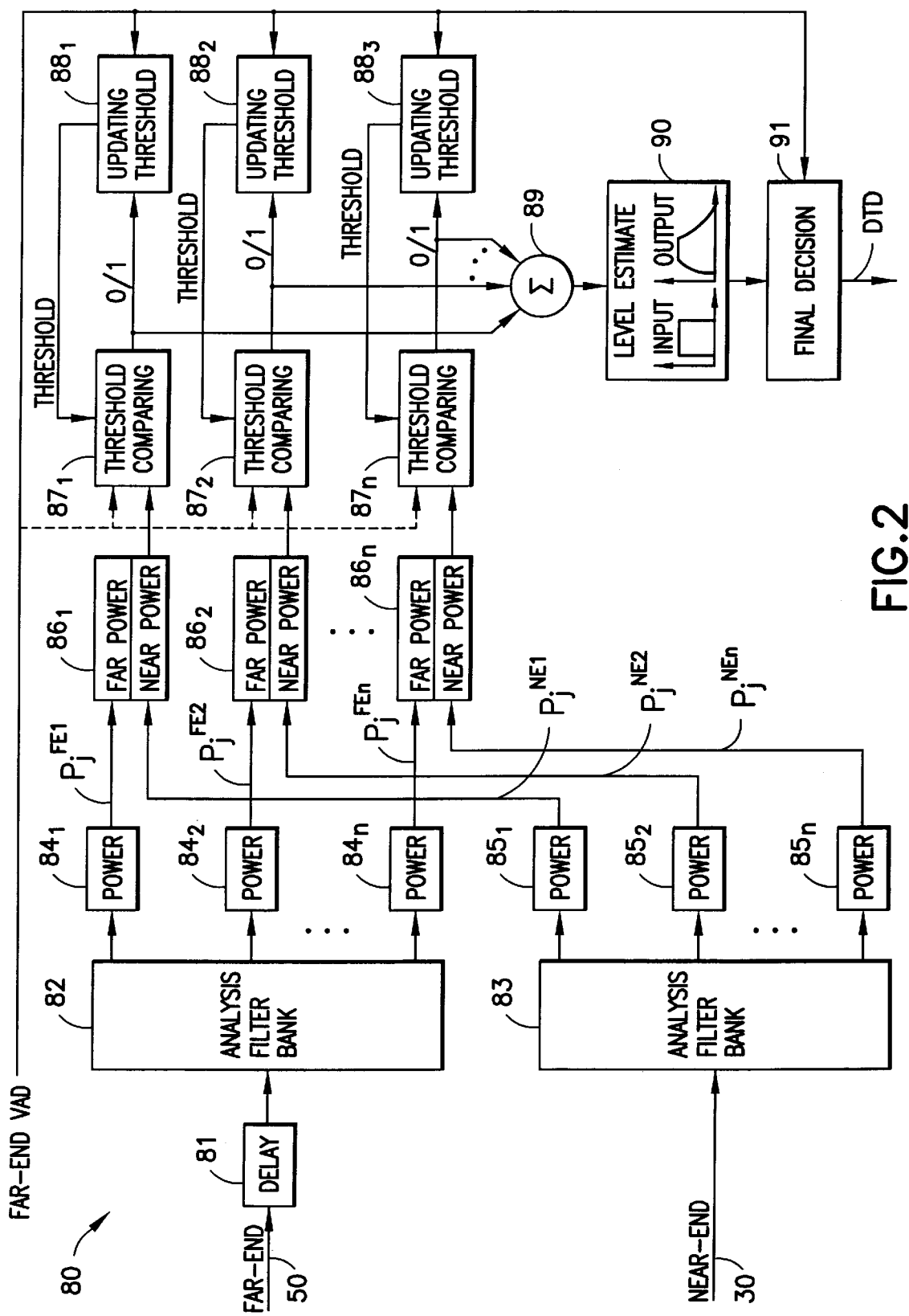
FIG. 2 presents a block diagram of an embodiment of a double talk detector according to the present invention.

FIG. 2 shows a block diagram of an embodiment of a double talk detector 80 according to the present invention. The double talk detector 80 receives as inputs the far-end signal 50 and near-end signal 30. In this example the double talk detector is digital and accordingly the analog speech signals are first sampled, e.g. by an A/D converter into a digital signal. Both near-end and far-end signals are divided into sub-channels, i.e. into sub-bands of the whole frequency band of speech. This is done in filter banks 82, 83 which as such are known to persons skilled in the art. In practice division is done into about 7–10 sub-channels. Also other solutions for dividing the signals into sub-channels can be used, e.g. FFT (Fast Fourier Transform). The division into sub-channels can be done samplewise or framewise, e.g. for every new 4 samples (frame length of 4 samples).

Before the frequency division in block 82 the far-end signal 50 is delayed in a delay means 81. Due to acoustic delay the far-end signal is delayed in order to have the far-end signal and near-end signal (the echo) in the same phase. The delay can be taken into account by estimating what delay arises when the speaker signal travels (in air) from the speaker to the microphone. For the example it is assumed that the distance between the speaker 7 and the microphone 2 is 1 meter (e.g. in hands-free equipment) and samples are taken from the signals at a rate of 8000 Hz. Sound travels in air (in a temperature of 20° C.) with a speed of 343 m/s. This causes a delay of 8000/(343/1) samples between the far-end signal coming from the speaker and the echo signal going into the microphone, which means a delay of 23 samples, which in time is 2.9 ms. The delay means 81 can be implemented e.g. by a hold circuit or buffer which holds the signal for the delay time specified. When implementing a telephone device as a speaker phone or with hands-free equipment, the distance between the speaker and microphone is normally known so the delay can accordingly be taken into account in advance. The delay improves the reliability of the detector by assuring that the far-end and echo signals are exactly synchronized.

Following division into sub-channels a power value is calculated of the signals in each sub-channel. For n sub-channels the power for each far-end signal is calculated in blocks $84_1$, $84_2$, . . . ,$84_n$ and the power for each near-end signal is calculated in blocks $85_1$, $85_2$, . . . ,$85_n$. Calculating the power samplewise is possible, but would lead to very much calculation. It is more efficient to calculate the power (and accordingly to detect double talk) in frames of several samples in order to save calculation. However, in order to achieve quick double talk detection the frames on which detection is performed should preferably be short. In the embodiment of FIG. 2 the power of each sub-channel may be calculated on and double talk detection performed on frames of the length of 24 samples. This may be achieved by collecting 24 consecutive samples (from the A/D converter) into frames or in parts, e.g. so that first smaller frames of 4 samples are formed and after 6 new smaller frames power is calculated and double talk detection is performed. A frame of the length 24 samples means in time with a sample rate of 8000 Hz the length of 3 ms. The shorter the frame the faster decisions can be made. Still an acceptable length with the sample rate of 8000 Hz could be around 100 samples, which in time means 12.5 ms.

Each sub-channel 1 . . . n can have 1 . . . N new samples for each calculated frame, where N is the number of samples in one frame (in this example N=24). The power can be calculated e.g. in two steps by first calculating a power $P_A$ of the frame in question from $$P_A = \frac{\sum_{i=1}^{N} x_i \cdot x_i}{N}$$

where $x_i$ is a sample of the frame of i=1 . . . . N samples. This is the average power of the samples of the frame. Further, in order to get a more reliable result the power is further averaged by taking into account the previous power values, i.e. the power values of the previous frames. Thereby the final power value $P_j$, i.e. power in a sub-channel at moment j can be calculated as $P_j=\alpha*P_{j-1}+(1-\alpha)*P_A$ where $\alpha$ is an averaging constant, e.g. in the range of 0.95. As a result a power value is achieved for each sub-channel for the far-end and near-end signals. These can be named as $P_j^{FE1}$, $P_j^{FE2}$, . . . $P_j^{FEn}$ for far-end sub-channel powers and $P_j^{NE1}$, $P^{NE2}$, . . . $P_j^{NEn}$ for near-end sub-channel powers.

The acoustic echo that is formed is affected by the media between the speaker 7 and microphone 2 in which the echo signal travels. The echo signal is accordingly the far-end signal that has been somewhat modified by the response of the media. Thereby the power ratio of the echo signal and the far-end signal is almost constant. If during far-end speech also near-end speech exists the power ratio changes significantly and this change is detected as double talk. The power ratio $PR_j^1$, $PR_j^2$, . . . $PR_j^n$ for each sub-channel k=1 . . . n is calculated in blocks $86_1$, $86_2$, . . . , $86_n$ as $$PR_j^k = \frac{P_j^{FEk}}{P_j^{NEk}}.$$

Figure 1:
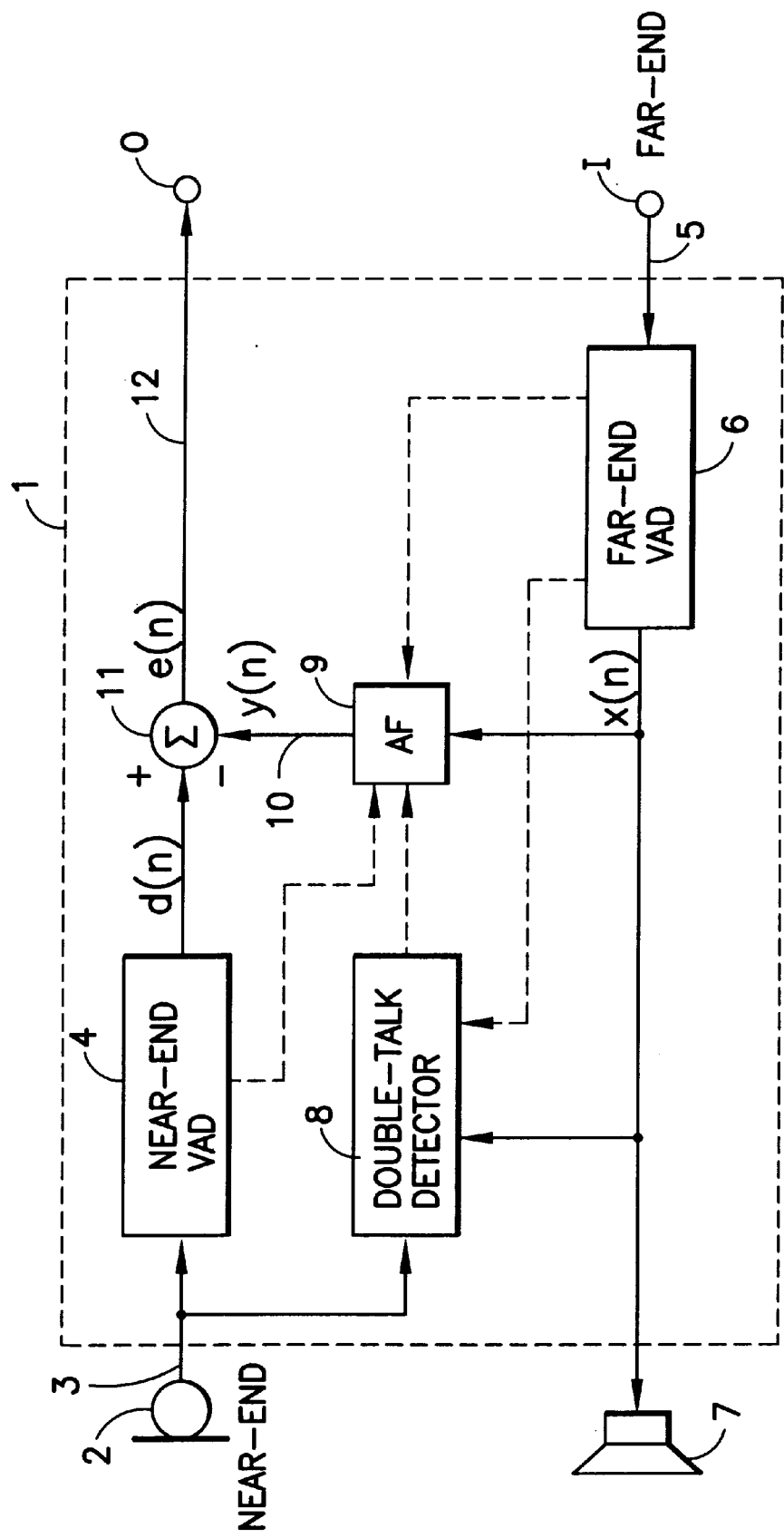
FIG. 1 presents a block diagram of a phone comprising a prior art echo canceller.

The power ratio $PR_j^k$ of each sub-channel is then compared to a threshold value $T_k$ in comparators $87_1$, $87_2$, . . . ,$87_n$. The threshold $T_k$, k=1 . . . n of the double-talk detector is defined during the breaks of double-talk. If the power ratio $PR_j^k$ is smaller than the threshold value $T_k$ there is double-talk and vice versa if the power $PR_j^k$ ratio is greater than the threshold value $T_k$ there is only acoustic echo. Also the output of the far-end VAD is to be taken into account. The far-end VAD 6 is located on the far-end signal path (for the whole frequency band) as shown in FIG. 1 and its output is fed to blocks $88_1$, $88_2$, . . . , $88_n$. Otherwise a wrong decision might be made in situations when the power ratio $PR_j^k$ is smaller than the threshold value $T_k$. This might be the situation e.g. due to loud noise at near-end, whereas in such a case if simultaneously no near-end speech exists no double talk exists either even though the power ratio $PR_j^k$ might be smaller than the threshold value $T_k$. Thereby different criteria is achieved for the comparators $87_1$, $87_2$, . . . ,$87_n$ for giving an output equivalent to a double talk decision. Accordingly the following conditions 1)–3) arise:

1) $PR_j^k<T_k$ (i.e. near-end signal exists) AND far-end VAD signal false (i.e. no far-end speech)
   →NO double talk situation, NO updating of threshold value. This is always the case when far-end VAD signal is false, i.e. also in case no speech exists.
2) $PR_j^k>T_k$ AND far-end VAD signal true
   →NO double talk situation, updating of threshold value
3) $PR_j^k<T_k$ AND far-end VAD signal true
   →double talk situation, updating of threshold value In these conditions the far-end VAD signal is considered in each comparison. This is shown by the dashed line drawn to blocks $87_1$, $87_2$, . . . ,$87_n$ in FIG. 2. In this case no far-end VAD decision would be needed for the final decision making block 91. However, a signal line for the far-end VAD decision signal is drawn to block 91 as well in order to illustrate the alternative solution of not considering the far-end VAD decisions in the threshold comparators 87, but only in making the final double talk decision. Alternatively the existence of speech at far-end could be recognized in another way than by using a VAD. For example the information of a system for discontinous transmission in which exact transmission and reception is known could be used to detect whether speech exists at far-end.

An output indicating double talk or no double talk in the sub-channel signals 1 . . . n is given from the comparators $87_1$, $87_2$, . . . ,$87_n$. This can be e.g. a simple bit having the value 0 if there is no double talk (conditions 1 and 2 above) and having the value 1 if there is double talk (situation 3 above).

The threshold values $T_k$ are updated and stored in blocks $88_1$, $88_2$, . . . ,$88_n$ according to following referring to the situations explained above:

1) no updating, old value is kept
2) $T_k(j)=\alpha*T_k(j-1)+(1-\alpha)*PR_j^k*\beta$, where $\alpha$ is about 0.95 and $\beta$ is scale factor ($0\leq\beta\leq1$)
3) $T_k(j)=\lambda*T_k(j-1)$, where $\lambda$ is ($0\leq\lambda\leq1$), but usually close to 1.

The threshold value for the comparison is received to the comparators $87_1$, $87_2$, . . . ,$87_n$ from blocks $88_1$, $88_2$, . . . ,$88_n$. The output of each comparator is input to an adding unit 89, which adds up the 1s and 0s received as subdecision signals. This sum is fed into a level estimation block 90 which rounds off the sum in order to avoid too steep changes, which could be caused for example by errors. The level estimation block rounds off the integer received from adding block 89 into a decimal value. The level estimation block 90 considers the values of previous frames. When double talk increases in consecutive frames the level estimation block 90 raises the value slowly, not suddenly. Correspondingly when double talk decreases in consecutive frames the output value from the level estimation block 90 is lowered slowly. For example, if the amount of sub-channels is 8 then the maximum possible value from block 89 would be 8. However, let us assume that the previous value from block 89 was 0 and suddenly there is double talk so that it outputs a value 4 to the level estimation block 90. Now the level estimation block 90 would e.g. output a value 2.0 and if still the following value from block 89 would be 4 then block 90 would output a value of e.g. 3.8. The level estimation block 90 may be implemented by software, e.g. by programming a signal processor. An example of an implementation of the level estimation block 90 by a software code in the C programming language is listed in annex 1. Alternatively the level estimation block 90 could be omitted so that signal from block 89 would go directly to block 91.

The final decision of double talk is made in the final decision block 91 which is a kind of comparator that includes a threshold value for the final double talk decision. The threshold could be set e.g. to 1 so that if even one sub-channel indicates double talk the final decision would be double talk as well. However, for avoiding false double talk decision that could be caused by an occasional error, the final decision value is preferably higher than 1. For 8 sub-channels the threshold value should be lower than 4, preferably in the range of 2–3, e.g. 2.5.

The output DTD from final decision block 91 is a result of the performed comparison either double talk or no double talk. This can be in the form of a bit of value 1 for double talk and 0 for no double talk.

The double talk decision signal DTD can be further fed to e.g. the adaptive filter 9 of an echo canceller 1 as is shown in FIG. 1. The double talk detector 80 of FIG. 2 can be used in an echo canceller instead of block 8 in FIG. 1. In an echo canceller, as the one shown in FIG. 1 the adaptive filter 9 is thereby controlled by the final decision DTD of the double talk detector. Accordingly a reliable updating or stop of the updating of parameters for the adaptive filter 9 will be achieved as the decision of the double talk detector is not sensitive to occasional errors for example occurring in one of the sub-channels. This is achieved e.g. due to being able to set the threshold of the final decision block 91 at a desired level and due to the rounding off in the level estimation block 90 before making the final double talk detection.

Figure 3:
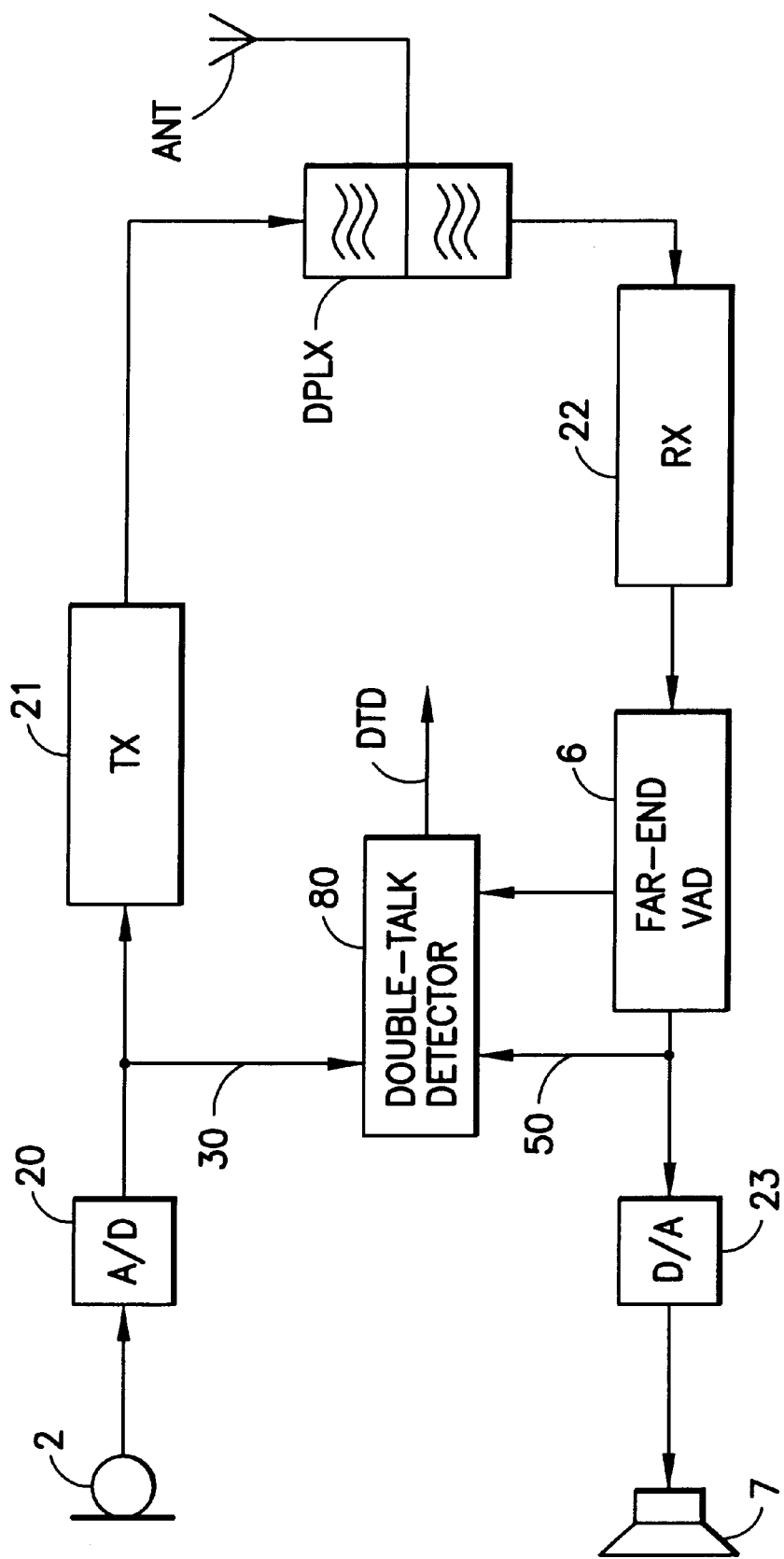
FIG. 3 presents a block diagram of a mobile station incorporating a double talk detector according to the present invention.

FIG. 3 presents a mobile station according to the invention, in which a double talk detector 80 according to the invention is employed. The speech signal to be transmitted, coming from a microphone 2, is sampled in an A/D converter 20, after which base frequency signal processing (e.g. speech coding, channel encoding, interleaving), mixing and modulation into radio frequency and transmittance is performed in block TX. The double talk detector 80 can be used for controlling e.g. an echo canceller (shown in FIG. 1) according to the output DTD. From block TX the signal is transmitted through a duplex filter DPLX and an antenna ANT. The known operations of a reception branch RX are carried out for speech received at reception (e.g. demodulation, deinterleaving, channel decoding, and speech decoding), after which far-end speech is detected in far-end Voice Activity Detector 6, then the signal is converted into an analog signal in D/A converter 23 and is repeated through loudspeaker 7. Instead of the VAD the information of a system for discontinous transmission in which exact transmission and reception is known could be used to detect whether speech exists at far-end. This information would exist in a control circuit (not shown in the figure).

The previous is a presentation of the realization and the embodiments of the invention using examples of the method and device and the implementation environment for the devices. For a person skilled in the art it is self evident that the invention is not limited to the details in the above embodiments and that the invention can be realized also in another form without deviating from the characteristics of the invention. The presented embodiments should be regarded informative but not limiting. Thus the possibilities for realization and use of the invention are limited only by the enclosed claims. Thus the different alternatives for realizing the invention defined by the claims including equivalent realizations are covered by the invention.

Annex 1

/* level—computes signal level for a vector of power inputs using exponential attack/release time parameters controlling speed of rise and fall

```
Parameters:
    *data: signal vector
    numChan - number of channels
    attRelPar - attack/release data stuct {attSum,attSub}
    type - see above
        attRel.sum = (ba+br)/2
        attRel.sub = (br-ba)/2
        ba = exp(-1/attackTime)
        br = exp(-1/releaseTime)
    *level - level vector        */
int level(Float *data, int numChan, attRelPar attRel, Float *level)
{
    int i;
    Float p;
    for (i=0; i<numChan; i++){
        p = data[i];
        level[i] = p + (level[i]-p) * attRel.sum
            + fabs(level[i] - p) * attRel.sub;
    }
        return 0;
```

What is claimed is:

1. A double talk detector for detecting double talk situations in a device capable of two-way voice communication, the double talk detector comprising means for receiving a speech signal, means for dividing the speech signal into subsignals representing specific frequency bands, means for performing a detection for each subsignal, and means for calculating subdecision signals on a basis of the detection, the subdecision signal indicating existence of double talk in the respective subsignals, and means for calculating a final decision signal as a double talk decision signal for the speech signal a basis of the subdecision signals.

2. A double talk detector according to claim 1, comprising means for receiving a far-end speech signal, means for receiving a near-end speech signal, means for dividing the far-end speech signal into first subsignals representing said specific frequency bands, means for dividing the near-end speech signal into second subsignals representing said specific frequency bands, means for calculating the power of each subsignal of the first subsignals, means for calculating the power of each subsignal of the second subsignals, means for calculating a ratio of the power of each subsignal of the first subsignals and the power of each subsignal of the second subsignals, means for comparing each calculated ratio to a first respective threshold value and for outputting a value as a result of said comparison, the value representing a subdecision signal, means for summing the respective subdecision signals into a sum signal, and means for comparing the sum signal to a second threshold value and for outputting a value as a result of said comparison, the value representing the final decision signal indicating the result of the double talk detection.

3. The double talk detector according to claim 2, further comprising means for delaying the far-end speech signal.

4. The double talk detector according to claim 2, further comprising means for saving and updating the value of each first respective threshold value.

5. The double talk detector according to claim 1, further comprising:

means for summing the subdecision signals into a sum signal; and means for comparing the sum signal to a second threshold value and for outputting a value as a result of said comparison, the value representing the final decision signal indicating the result of the double talk detection.

6. The double talk detector according to claim 5, wherein double talk is detected only when said second threshold is exceeded.

7. The double talk detector according to claim 5, wherein each subdecision signal is represented as a first value or as a second value, and wherein the means for summing sums the first values and the second values.

8. The double talk detector according to claim 7, wherein the first value is a one and the second value is a zero.

9. The double talk detector according to claim 8, wherein there are eight subsignals, and the second threshold is set lower than 4.

10. The double talk detector according to claim 9, wherein the second threshold is set at approximately 2.5.

11. A method for detecting double talk situations in two-way voice communication, the method comprising the steps of receiving a speech signal, dividing the speech signal into subsignals representing specific frequency bands, performing a detection for each subsignal, and calculating subdecision signals on a basis of the detection, the subdecision signal indicating existence of double talk in the respective subsignals, and calculating a final decision signal as a double talk decision signal for the speech signal on a basis of the subdecision signals.

12. The method according to claim 11, further comprising:

summing the subdecision signals into a sum signal; and comparing the sum signal to a second threshold value and outputting a value as a result of said comparison, the value representing the final decision signal indicating the result of the double talk detection.

13. The method according to claim 12, wherein double talk is detected only when said second threshold is exceeded.

14. The method according to claim 12, wherein each subdecision signal is represented as a first value or as a second value, and wherein the summing sums the first values and the second values.

15. The method according to claim 14, wherein the first value is a one and the second value is a zero.

16. The method according to claim 15, wherein there are eight subsignals, and the second threshold is set lower than 4.

17. The method according to claim 16, wherein the second threshold is set at approximately 2.5.

18. A device capable of two-way voice communication comprising a double talk detector for detecting double talk, the device comprising means for receiving a speech signal, means for dividing the speech signal into subsignals representing specific frequency bands, means for performing a detection for each subsignal, and means for calculating subdecision signals on a basis of the detection, the subdecision signal indicating existence of double talk in the respective subsignals, and means for calculating a final decision signal as a double talk decision signal for the speech signal on a basis of the subdecision signals.

19. The device according to claim 18, further comprising:

means for summing the subdecision signals into a sum signal; and means for comparing the sum signal to a second threshold value and for outputting a value as a result of said comparison, the value representing the final decision signal indicating the result of the double talk detection.

20. The device according to claim 19, wherein each subdecision signal is represented as a first value or as a second value, and wherein the means for summing sums the first values and the second values.

21. The device according to claim 18 wherein double talk is detected only when said second threshold is exceeded.

22. The device according to claim 20, wherein the first value is a one and the second value is a zero.

23. The device according to claim 22, wherein there are eight subsignals, and the second threshold is set lower than 4.

24. The device according to claim 23, wherein the second threshold is set at approximately 2.5.

* * * * *